Figure 3:
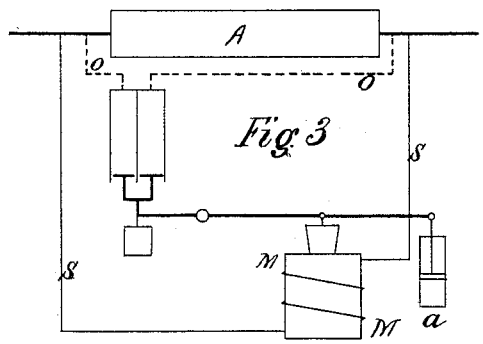

(No Model.) 2 Sheets—Sheet 1.
C. HERING.
CONSTANT POTENTIAL REGULATOR.
No. 350,676. Patented Oct. 12, 1886.
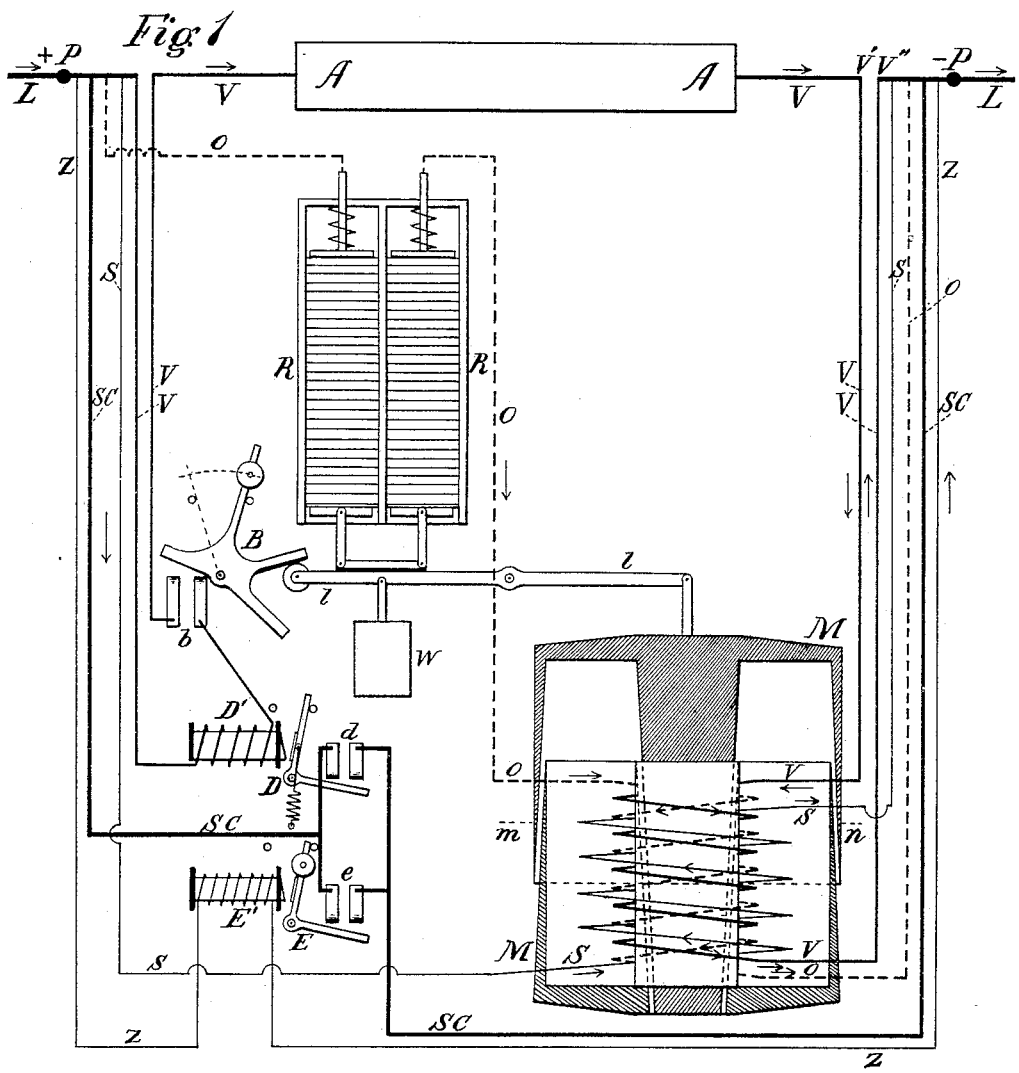
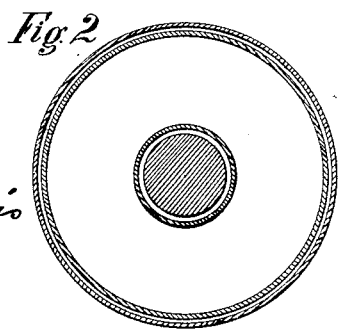
WITNESSES:
INVENTOR
Carl Hering, (No Model.) 2 Sheets—Sheet 2.
C. HERING.
CONSTANT POTENTIAL REGULATOR.

No. 350,676. Patented Oct. 12, 1886.

WITNESSES:
J. Newton Peirce,
G. H. Maxwell

INVENTOR:
Carl Hering.

UNITED STATES PATENT OFFICE.

CARL HERING, OF PHILADELPHIA, PENNSYLVANIA.

CONSTANT-POTENTIAL REGULATOR.

SPECIFICATION forming part of Letters Patent No. 350,676, dated October 12, 1886.

Application filed June 24, 1886. Serial No. 206,103. (No model.)

*To all whom it may concern:*

Be it known that I, CARL HERING, a citizen of the United States, residing at Philadelphia, in the county of Philadelphia and State of Pennsylvania, have invented new and useful Improvements in Constant-Potential Regulators, of which the following is such a specification as will enable one skilled the art to make and use the same, reference being had to the accompanying drawings.

The object of my invention is to maintain the electrical potential constant at the poles of a variable resistance inserted in an electrical current. If, for instance, an electroplating-bath is to be inserted in the same series with other apparatus—such as other baths, motors, lamps, &c.—the circuit, which may have a constant or variable current, must be kept closed, while at the same time it is necessary for the proper working of the bath that the electro-motive force or potential at the poles of the bath should be kept constant for all changes of resistances in the bath itself. The function of my new regulator is to keep this potential constant for varying resistances of the translating device, or for varying current strength in the main-line circuit, and is therefore applicable not only to baths, but in all other cases in which a constant potential is desired at two points of a circuit. If a variable resistance is inserted in series with other devices, and it is desired to keep the the potential at the poles of this resistance constant, it is evident from Ohm's law that the current in the variable resistance must vary in inverse proportion to its variable resistance, and that, therefore, the desired object may be accomplished by leading off from the poles of this resistance a certain varying amount of current, which I will term the "overflow-current." It is evident that if this overflow-current is of such an amount as to leave the rest of the main current at all times inversely proportional to the varying resistance, then the electro-motive force or potential at the poles of the resistance will be kept constant. This is the principle of my regulator, in which an adjustable resistance in the overflow-circuit is automatically varied to adjust the overflow-current to its proper amount for maintaining the potential constant. This adjustable overflow-resistance is varied by an electro motive device actuated by the combined action of an independent separate circuit from the constant-potential poles of the device, and of the overflow-circuit itself or its complement, or both.

Figure 1 represents the general arrangement of the circuits and devices of my regulator. Fig. 2 is a cross section along *m n* of my new improved magnet M M, Fig. 1. Figs. 3, 4, 5, 6, 7, 8 are diagrammatic representations of some modifications of the regulator shown in Fig. 1.

The action of my regulator is, in general, as follows: An electro-motive device—as, for instance, a magnet—is wound with a wire whose ends are connected to the poles which are to have a constant potential. When from any cause the potential at the poles increases, the current in the magnet will increase, thereby adjusting the armature of the electro-magnet, which decreases an adjustable resistance in the overflow circuit, thus increasing the overflow-current until the potential has fallen to the normal amount. It is evident, however, that if there were no other winding in the magnet, it would, when the potential has fallen, again release its pull on the armature, and thereby again tend to restore the original resistance in the overflow-circuit. In other words, such an apparatus would come to rest at a slightly-increased potential, for the reason that for a different overflow-resistance the armature of the electro-magnet must have a different position, which it can have only for a different current in its winding; but this current can be greater only for a greater potential at its terminals, as its resistance is constant. Therefore, when it has adjusted the overflow-resistance, the potential will be slightly different from what it was before. This may be sufficient for many purposes; but when greater precision is desired, I improve the regulator as follows: I wind a second wire around the same regulator-magnet in the same direction and connect this in the circuit of the overflow-current, so that the increased magnetism due to this increased overflow-current is just sufficient to keep the armature in place when the current in the other circuit has again fallen to its constant value; or, in other words, the increased overflow-current is just sufficient to supply the deficiency mentioned above in the case of a single winding. The function of the first-mentioned winding is to actuate the magnet, and that of the second is to hold the mechanism in place after it has adjusted the resistance.

In Fig. 1, L L represent the line-circuit, into which the varying resistance and the regulator are placed. +P and —P are the two poles of the apparatus at which the potential is to be kept constant. A A is the electrical bath or baths, motors, or other devices which have a varying resistance, and whose poles are to be kept at a constant potential. The main, overflow, and auxiliary circuits all terminate in the poles +P and —P, and are here all drawn separately throughout their whole length, without cross or branch connections, for the sake of clearness. They are represented by different kinds of lines, and are marked throughout with the same letters. The main-line current enters at +P, and passes along the circuit V through the safety cut-out D' and the switch b when closed; then through the baths, motors, or other devices, A A, and out at —P, through V' V", which at present will be assumed to be short-circuited across from V' to V".

The overflow-circuit is indicated by a dotted line marked O, and passes from +P through the adjustable overflow-resistance R R, thence through the regulator-magnet M M to the pole —P. The independent regulator-circuit (marked S) is a high-resistance circuit passing through the regulator-magnet M M, and connected directly to the poles +P and —P. These two currents—viz., the overflow O and the independent regulator current S—together actuate the regulator-magnet M M of novel construction. If for any reason the potential at the poles +P and —P should increase, the current in the circuit S will increase, thereby actuating the magnet, which draws down the armature above it, which in turn moves the lever l l, and decreases the resistance R R in the overflow-circuit. This increases the overflow-current O, thereby decreasing the potential at P P to its normal amount; but this increased current O also passes around the magnet M M in the same direction as the current S, thereby supplying the amount of magnetism necessary to hold the lever in place after the proper potential has been restored and the current in S has again fallen to its constant amount. It is evident that besides the function of the current O just mentioned it has also the additional function of making the magnet more sensitive by assisting the current S to actuate the magnet, for when the potential at +P and —P increases the current in the overflow-circuit must also increase before the resistance R R has been adjusted, thus assisting the current S to overcome the inertia and friction of the parts of the apparatus.

There may be two reasons for a change of potential at +P —P. Either the main current in the line L L may vary, or the resistance of A A may vary. From the nature of the regulator it is evident that it will act in either case.

When the current in the line varies, or when the resistance in A A varies, it is evident that the current in the overflow-circuit will also vary before the regulator acts. The device M M may therefore be actuated by that current alone without the aid of the shunt-current S; but this is not as sensitive nor as reliable as when it acts in conjunction with the current in the circuit S, or when the current S alone is used.

In order to further improve the regulator, I sometimes add a third winding (shown in full lines) and connect it into the principal circuit V V, as shown at V' V". This winding is so connected as to oppose the action of the other two. The function of this is as follows: If the main current is approximately constant, an increase in the resistance of A A will lessen the current in V V and at the same time increase the current in O before the regulator acts, and therefore the difference between these two currents will appear as active current in the magnet. This difference must always be greater than the changes in either one, therefore increasing the sensitiveness of the magnet to changes of resistance in A A. If, for instance, the number of windings for O and V are the same, and the current V were to be changed by one ampère, the effective difference in the magnet would be two ampères.

For a constant current in the main line the sum of the two currents O and V will be a constant, and therefore as one increases the other diminishes. It is therefore quite immaterial whether the electro-motive device M M be wound with the circuits S and O in the same sense, or with the circuits S and V in an opposing sense, for in the first case we add the effect of a current, O, to that of S, and in the other we subtract the effect of its arithmetic complement V, which is ultimately the same. Although the effect is precisely the same, yet in the first case less wire is required than in the second to produce the same mechanical force, and I therefore prefer to use the first method, as described.

Figure 4:
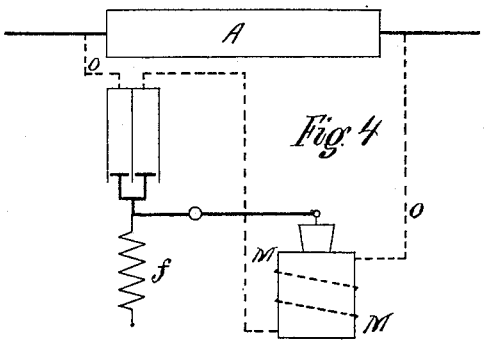
Figure 5:
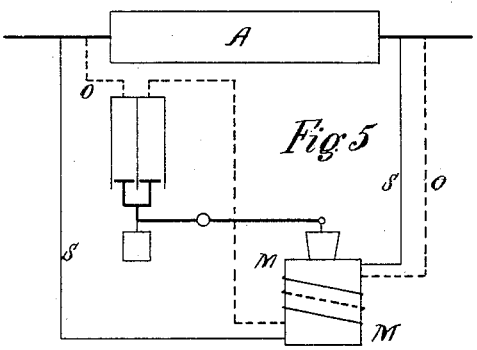
Figure 6:
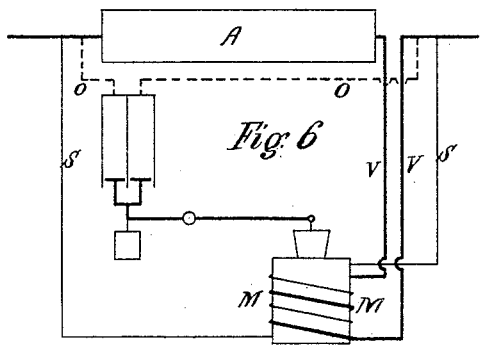

The modifications mentioned above in the circuits through the electro-motive device are shown separately in Figs. 3, 4, 5, and 6. The different parts are shown in outline merely, as they are essentially the same as in Fig. 1, and are indicated by the same letters. In Fig. 3 the independent shunt-current S alone actuates the electro-motive device M M. In Fig. 4 the overflow-current alone acts in the device M M. In Fig. 5 the shunt and overflow currents S and O act together in the device M M. In Fig. 6 the shunt and principal or main currents S and V act together in the device M M.

Figure 7:
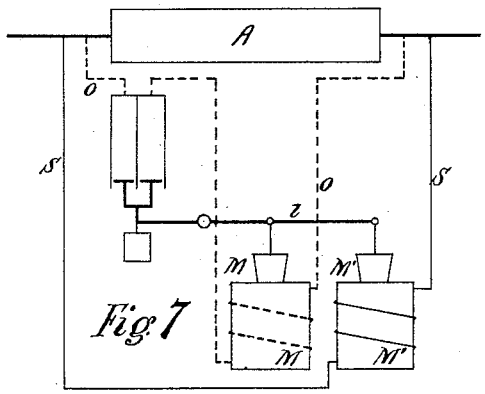
Figure 8:
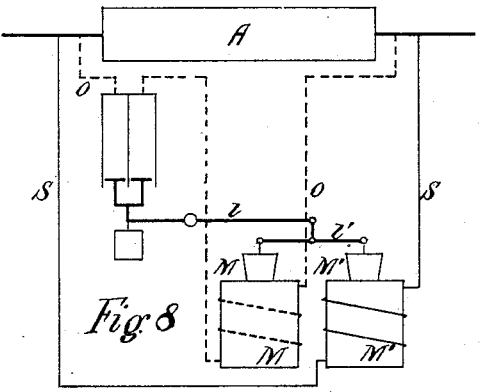

It is evident that instead of winding one electro-motive device with several independent windings whose joint action determines the action of the regulator it would be equally effective to have a separate electro-motive device for each winding, the joint action of which electro-motive devices determines the action of the regulator. This is shown in Figs. 7 and 8, in which there are two electro-motive devices, M M and M' M', each being actuated by a separate current. In this case the two devices may both act directly on the lever $l$, as in Fig. 7, or they may act together on a separate lever, $l'$, which is connected to the main lever $l$, as in Fig. 8. I prefer, however, to use the apparatus in its simplest form by using one electro-motive device dependent on the joint action of its several windings.

It is evident that the function of the magnet M M—namely, to produce a mechanical motion for changes of current in its windings—may also be accomplished by any other similar device—as, for instance, a solenoid with movable core, an electric motor, &c. I prefer, however, to use the following novel device, which I term a "long-pull magnet," and for which I have made a separate application, No. 213,481, filed September 14, 1886.

In Fig. 1, M M is a vertical cross-section of my long-pull magnet, in which the coils and the shell of the core inside of the coil are represented in full. Fig. 2 is a horizontal cross-section of M M, Fig. 1, along the line $m\ n$, the coils being omitted for the sake of clearness. The principle is as follows: The distance between the armature and the magnet, measured in the direction of the motion—that is, parallel to the axis—is very great, while the normal distance between the active surfaces of the two magnetic parts is very small, as compared to the distance which they move relatively to each other. In other words, the thickness of the high magnetic-resistance air-space is very small and its area is very large, thus decreasing the magnetic resistance, while the possible motion of the armature and magnet toward each other is very great. I accomplish this by making the active surface of one of the two magnetic parts conical, and the active surface of the other part I make the female counterpart of this cone, the amount of inclination of the surfaces to the axis being dependent on the amount of motion required in proportion to the size of the magnet. I further improve the magnet by completely surrounding the coil with iron, as shown in the figure, thus very greatly increasing the magnetic effect of the coil. It is evident, however, that this outer shell surrounding the coil is not essential. I may still further improve it by proportioning the iron in different parts, so that the cross-section of the iron perpendicularly to the magnetism is always the same, or approximately so, as shown, in which the area of the annular mass of iron around the outside of the coil is equal to that of the iron inside the coil, while at the top and bottom the thickness decreases as the diameter increases. This distribution of iron evidently gives the maximum effect with the minimum amount of iron. In order to avoid too sudden movements of the armature, I connect the same with a suitably-arranged dash-pot of any of the ordinary forms of construction. This is shown at $a$, Fig. 3.

Among the accessories which I may use with my regulator are the following: An adjustable resistance, R R, which may be made to vary gradually, as distinguished from one which varies in steps, thus at the same time preventing all possible sparks due to cutting out resistance. A weight, W, tends to balance the armature of the magnet M M. This may evidently be replaced by a spring, as at $f$, Fig. 4. The switch B has the following function: When the line-current L L is first started, the resistance of R R must, from the nature of the regulator, be its maximum, and therefore most of the current would pass through V, and therefore through A A, which would in most cases be injurious. The switch B is therefore open at $b$ in the circuit V, thus compelling the whole current to pass first through O and S, thereby actuating the magnet and the lever $l\ l$, which moves the switch B and closes the circuit V at $b$ after the resistance R R has been decreased. When the line-current stops, the weight W moves the lever $l\ l$ against the lower arm of the bell-crank lever of the switch B, and thereby opens the switch B at $b$, cutting out the circuit V, when dead, and thereby protecting it from a dangerous current at starting. In the switch B, as well as at D and E, I prefer to use a novel form of switch, which I term an "inverted-pendulum switch." The essential feature of this switch is, that a pivoted lever which is actuated mechanically, as B, or magnetically, as E, contains a weight over its pivot, which causes the lever to take one of two positions, according as the weight is on one or the other side of the vertical line through the pivot. It furthermore holds the lever in that position. It is evident that the action of gravity in the inverted pendulum may be replaced by an eccentrically-pulling spring, as shown at the switch D.

The auxiliary safety cut-out switches D D' $d$ and E E' $e$ are for short-circuiting the poles $+$P and $-$P through the short circuit S C, in cases of faults, failures, or dangerous currents. The first one, D D' $d$, is inserted in the main circuit V, and protects the apparatus A A and the regulator from a dangerously high current, in case of failure to regulate, or of a line-current greater than the capacity of the regulator. The second, E E' $e$, is inserted in a shunt-circuit, Z Z, and protects the apparatus A A and regulator from too high a potential at $+$P and $-$P, in cases of failure of regulator. It is evident that E' may be inserted in the circuit S, if desired.

The advantages which I claim for my regulator are as follows: By means of the double winding on the electro-motive device M M, I am enabled to obtain much greater precision and sensitiveness than with only one winding. By means of the third winding in the main circuit V, I still further increase the sensitiveness. By means of the long-pull magnet I obtain greater force and motion with the least expenditure of energy, and am thereby enabled to use a gradually-varying overflow-resistance R R—such, for instance, as compressed carbon plates—thereby obtaining finer regulation and preventing all injurious sparking, as by the objectionable and perishable sliding or mercury contacts. By means of the greater force of the magnet M M, I may use a solid resistance, R R, in place of an objectionable and perishable liquid resistance. By means of this combination of parts I obtain absolute protection of the main apparatus A A. I also prevent all possibility of sparking by having all live circuits or parts of circuits closed continually, the switch $b$ being opened or closed only when the circuit V is dead, and the short-circuiting switches only close, but do not open a circuit.

By using a powerful long-pull magnet, an adjustable overflow-resistance, as described, and an almost direct mechanical action between the magnet and the resistance I am enabled to entirely eliminate all clock-work, ratchets, wheels, springs, &c., and thereby decrease the friction to a minimum.

I claim as my invention—

1. A regulator for maintaining the potential at two points of a circuit constant, consisting, essentially, of the following elements in combination: an adjustable overflow-resistance, an electro-motive device for varying the same, and two circuits for conjointly actuating the electro-motive device, one of which is a high-resistance circuit between the poles of the regulator, and the other the shunt-circuit, which includes the variable overflow-resistance.

2. A regulator for maintaining constant the potential at the two poles of an electro-receptive device in a line-circuit, and consisting, essentially, of the following elements in combination: an adjustable resistance of carbon or other solid material for variably shunting the electro-receptive device, an electro-motive device for varying this resistance by compressing it, a circuit connected to the two poles of the regulator for shunting the superfluous current around the electro-receptive device, and a circuit or circuits shunting the electro-receptive device (or the equivalent circuit—namely, the circuit through the electro-receptive device itself) for actuating the electro-motive device.

3. In a regulator for maintaining constant the potential at the two poles of an electro-receptive device in a line circuit, the combination of a continuously-variable resistance of carbon or other solid substance connected as a shunt to the electro-receptive device for leading off the superfluous current, an electro-motive device for operating this variable resistance, and a circuit or circuits for actuating this electro-motive device, shunting the electro-receptive device, and in which the current varies on variations of the potential or current of the electro-receptive device.

4. An electro-motive device for varying an adjustable overflow-resistance, which shunts an electro-receptive device, substantially as and for the purpose described, consisting, essentially, of movable magnetic parts and two coils operating the same conjointly and shunting the electro-receptive device, one connected directly to the poles of the electro-receptive device for detecting changes of potential, and the other connected in series with the variable overflow-resistance, substantially as and for the purpose described.

CARL HERING.

Witnesses:
 VALENTINE MORRIS,
 GEO. W. CLOSE.